(12) United States Patent
Kim

(10) Patent No.: US 7,538,835 B2
(45) Date of Patent: May 26, 2009

(54) VIEWING ANGLE COMPENSATING PLATE AND LIQUID CRYSTAL DISPLAY PANEL INCLUDING THE SAME

(75) Inventor: Jong-Oh Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 137 days.

(21) Appl. No.: 10/778,965

(22) Filed: Feb. 13, 2004

(65) Prior Publication Data

US 2004/0239850 A1 Dec. 2, 2004

(30) Foreign Application Priority Data

May 27, 2003 (KR) .................. 10-2003-0033571

(51) Int. Cl.
G02F 1/1335 (2006.01)
(52) U.S. Cl. ....................... 349/96; 349/117
(58) Field of Classification Search .............. 349/119
See application file for complete search history.

(56) References Cited

U.S. PATENT DOCUMENTS

| | | | |
|---|---|---|---|
| 6,417,904 B1 * | 7/2002 | Yamaoka et al. | 349/117 |
| 6,630,973 B1 * | 10/2003 | Matsuoka et al. | 349/117 |
| 2002/0063828 A1 * | 5/2002 | Negoro et al. | 349/117 |
| 2002/0135716 A1 * | 9/2002 | Watanabe et al. | 349/113 |
| 2003/0210370 A1 * | 11/2003 | Yano et al. | 349/117 |
| 2004/0001172 A1 * | 1/2004 | Tanaka et al. | 349/113 |

FOREIGN PATENT DOCUMENTS

| | | | |
|---|---|---|---|
| JP | 07191217 A | * | 7/1995 |
| JP | 09-222511 | | 8/1997 |
| JP | 10-300926 | | 11/1998 |
| JP | 11-271763 | | 10/1999 |
| JP | 2001-083323 | | 3/2001 |
| JP | 2002-090536 | | 3/2002 |
| JP | 2002-090545 | | 3/2002 |
| JP | 2002-174727 | | 6/2002 |
| JP | 2002-202412 | | 7/2002 |
| JP | 2002-229070 | | 8/2002 |
| JP | 2002-243940 | | 8/2002 |
| JP | 2002-350853 | | 12/2002 |
| JP | 2003-029033 | | 1/2003 |
| JP | 2002-341136 | | 11/2007 |

* cited by examiner

Primary Examiner—David Nelms
Assistant Examiner—W. Patty Chen
(74) Attorney, Agent, or Firm—F. Chau & Associates, LLC (57) ABSTRACT

A viewing angle compensating plate has a first protection film, a polarizing film, a second protection film and a liquid crystal layer. The polarizing film is formed on the first protection film, and the second protection film is formed on the polarizing film. The liquid crystal layer is formed on the second protection film. The second protection film has a rate of thermal expansion and contraction that is substantially identical to that of the first protection film.

6 Claims, 10 Drawing Sheets

VIEWING ANGLE COMPENSATING PLATE AND LIQUID CRYSTAL DISPLAY PANEL INCLUDING THE SAME

BACKGROUND

1. Technical Field

The present disclosure relates to a viewing angle compensating plate and a liquid crystal display panel including the same.

2. Discussion of Related Art

Liquid crystal display devices have gained widespread acceptance in usage over cathode ray type displays. Liquid crystal display devices operate at a low voltage and consume low power, have low weight and small physical size, and operating circuits and peripheral circuits of liquid crystal display devices are relatively simple. An example of a conventional liquid crystal display apparatus is an absorptive or scattering liquid crystal display apparatus, such as a guest host liquid crystal display apparatus, polymer dispersion liquid crystal (PDLC) display apparatus or polymer stabilized cholesteric texture (PSTC) display apparatus. Another example of a conventional liquid crystal display apparatus is a polarizing liquid crystal display apparatus, such as a twisted nematic mode liquid crystal display apparatus. An absorptive or scattering liquid crystal display apparatus has a wide viewing angle, but also has a poor contrast ratio. On the other hand, a polarizing liquid crystal display apparatus has an excellent contrast ratio, but also has a narrow viewing angle. A polarizing liquid crystal display apparatus has a narrow viewing angle because the phase change of light passing through a liquid crystal layer varies depending on the direction of an optical path, and light that is not perpendicular to a polarizer is not totally extinguished while passing through an analyzing plate.

Liquid crystal display devices are commonly used as desktop monitors, and thus require a wider viewing angle. Technology such as multidomain technology, in-plane switching (IPS) technology, vertical alignment technology, optical path adjusting technology, and viewing angle compensating technology, has been developed to achieve a wider viewing angle.

In multidomain technology, one pixel is divided into a plurality of blocks, and liquid crystal molecules in each block are aligned in a different way. The average features of the blocks in the pixel represent the overall feature of the pixel, thereby improving the viewing angle. However, the process of aligning the liquid crystal molecules of each block in a different direction is complicated. Moreover, in a boundary between two blocks, alignment of liquid crystal molecules are not adjusted, resulting in leakage of light. Thus, a black matrix or a wiring of a thin film transistor is needed to block the leakage. Also, because a final viewing angle is represented as an average of viewing angles in various directions, the final viewing angle is widened in a direction that has a relatively narrow viewing angle. However, the final viewing angle is narrowed in a direction that has a relatively wide viewing angle.

In in-plane switching technology, the alignment of liquid crystal is twisted in a plane that is parallel with an alignment film by a lateral electric field, thereby widening the viewing angle. Liquid crystal display devices employing in-plane switching technology are commonly used in 17-inch desktop monitors to achieve a wider viewing angle. However, a liquid crystal display apparatus employing in-plane switching technology has a low aperture ratio, a long response time, and a relatively high operating voltage.

In vertical alignment mode technology, viewing angle is improved by using a vertical alignment agent, liquid crystal having a negative dielectric anisotropy and a phase plate. The arrangement of discotic liquid crystal in a vertical alignment mode liquid crystal display apparatus is simpler than that of a 90°-twisted nematic mode liquid crystal display apparatus. A phase plate is attached to one side of a liquid crystal layer in a vertical alignment mode liquid crystal display apparatus, whereas phase plates are formed on and beneath a liquid crystal layer in a 90°-twisted nematic mode liquid crystal display apparatus. Thus, manufacturing cost for a vertical alignment mode liquid crystal display apparatus is less than that of a 90°-twisted nematic mode liquid crystal display apparatus. The above-mentioned multidomain technology is typically employed in conjunction with vertical alignment technology.

In optical path adjustment technology, light irradiated from a backlight penetrates a liquid crystal panel in a vertical direction, and the light passing through a polarizer is scattered, thereby widening the viewing angle. Spectra view film, available from Allied Signal, Inc., may be used to scatter light that has passed through the polarizer. Generally, light is absorbed by about 10% or more when passing through an optical part. Thus, in optical path adjustment technology, transmittance of light is reduced. Moreover, patterns are formed using microlithography instead of an injection molding method, thereby increasing manufacturing cost. Light control film (LCF), manufactured by Sumitomo Chemical Company Limited, may provide a wide viewing angle by disposing diffraction gratings having various refractive indexes between a polarizer and a liquid crystal layer to adjust the degree of scattering. However, optical path adjustment technology has exhibited little effectiveness, and research of this technology is limited.

In viewing angle compensating technology, phase differences between light waves passing through a liquid crystal layer are compensated using a viewing angle compensating plate. Thicknesses of films in a conventional compensating plate differ from one another. Thus, rates of thermal expansion or contraction of the films are different, and an optical axis and a retardation value are changed due to stress differences at interfaces between the films, thus generating mottle as shown in FIG. 1.

Figure 1:
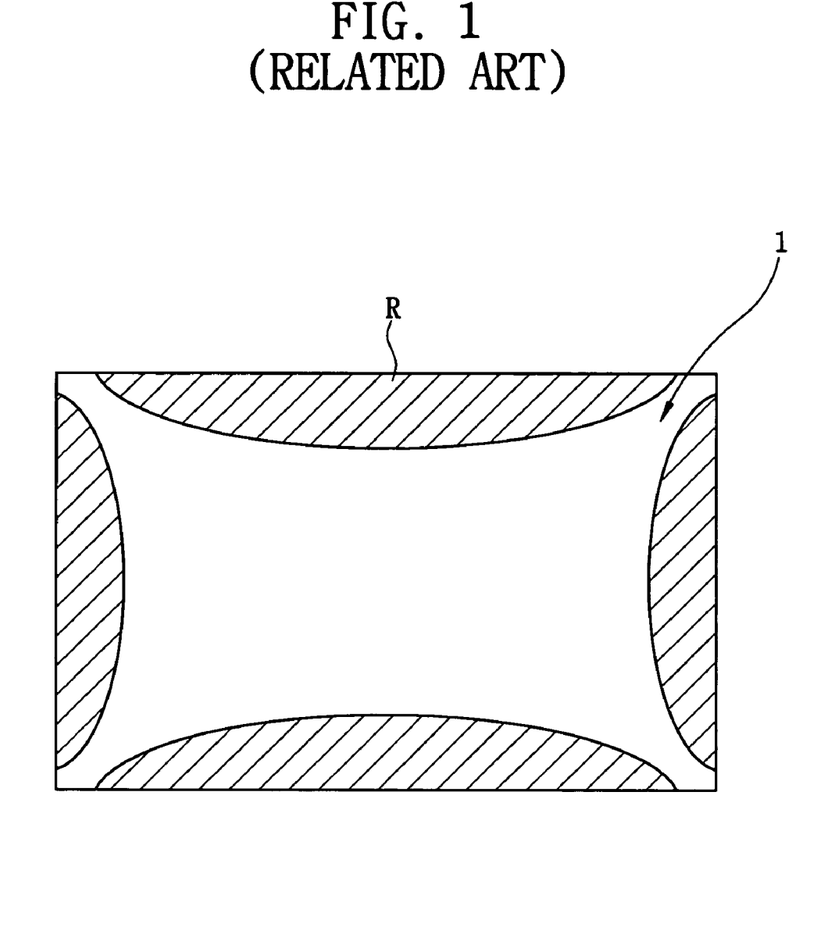
FIG. 1 is a plan view illustrating portions of an image having mottle generated by a liquid crystal display apparatus including a conventional viewing angle compensating plate.

FIG. 1 is a plan view illustrating portions of an image having mottle generated by a liquid crystal display apparatus including a conventional viewing angle compensating plate.

Referring to FIG. 1, mottle is generated in region 'R' of an image 1 when a conventional viewing angle compensating plate having films of different thickness is attached to a liquid crystal display apparatus. Mottle diminishes display quality of a liquid crystal display apparatus.

SUMMARY OF THE INVENTION

A viewing angle compensating plate according to an embodiment of the invention includes a first protection film, a polarizing film formed over the first protection film, and a second protection film formed over the polarizing film. The second protection film has a rate of thermal expansion and contraction that is substantially identical to that of the first protection film. A liquid crystal layer is formed over the second protection film.

A liquid crystal panel according to an embodiment of the invention includes an array substrate, a color filter substrate formed over the array substrate, a first liquid crystal layer disposed between the array substrate and the color filter substrate, and at least one viewing angle compensating plate forming an outer layer of the liquid crystal display panel. The viewing angle compensating plate includes a first protection film, a polarizing film formed over the first protection film, and a second protection film formed over the polarizing film. The second protection film has a rate of thermal expansion and contraction that is substantially identical to that of the first protection film. A second liquid crystal layer is formed over the second protection film.

BRIEF DESCRIPTION OF THE DRAWINGS

The present invention will become readily apparent by reference to the following detailed description when considered in conjunction with the accompanying drawings wherein.

DESCRIPTION OF PREFERRED EMBODIMENTS

Exemplary embodiments of the present invention are described in detail below with reference to the accompanying drawings.

Figure 2A:
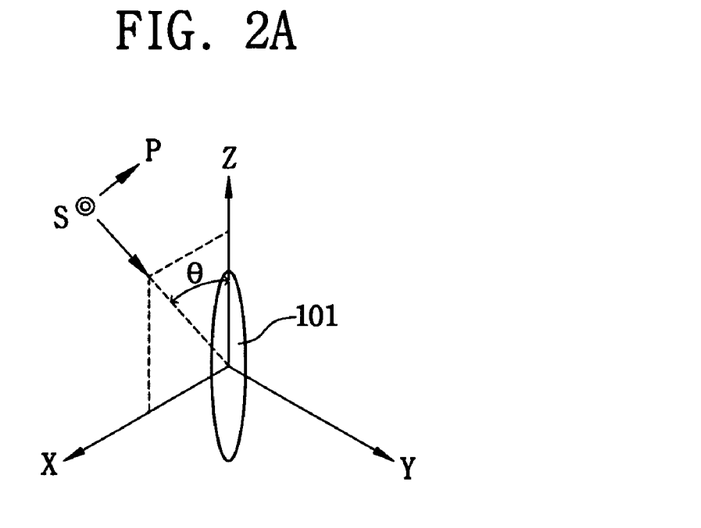
FIG. 2A is a diagram illustrating refractive indexes of nematic liquid crystal with respect to X, Y and Z axes.
Figure 2B:
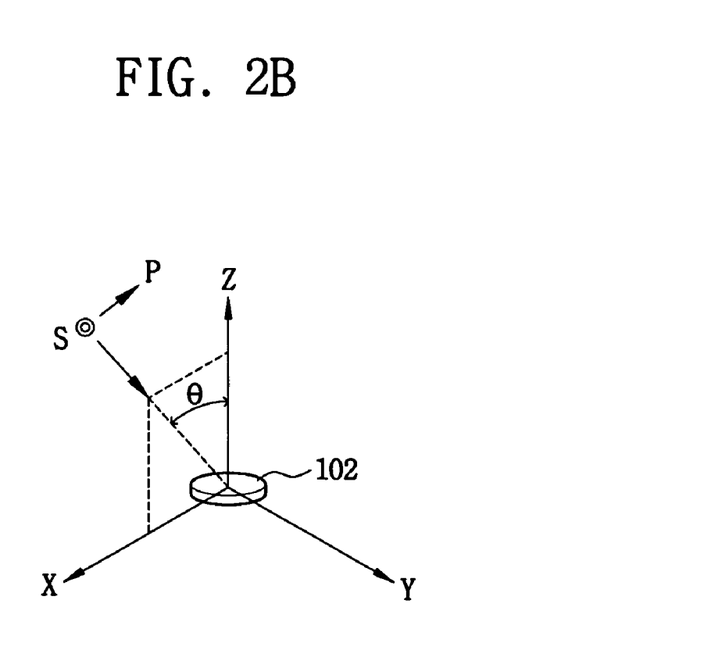
FIG. 2B is a diagram illustrating refractive indexes of discotic liquid crystal with respect to X, Y and Z axes.

FIG. 2A is a diagram illustrating refractive indexes of nematic liquid crystal with respect to X, Y and Z axes. FIG. 2B is a diagram illustrating refractive indexes of discotic liquid crystal with respect to X, Y and Z axes.

Referring to FIG. 2A, as light having an incident angle (Θ) with respect to the director of nematic liquid crystal 101 increases, a refractive index for a primary (P) wave increases in a liquid crystal layer ($\Delta n_p/\Delta\Theta > 0$). Here, the refractive index in an X direction '$n_x$' and the refractive index in a Y direction '$n_y$' are substantially identical, each of which is smaller than the refractive index in a Z direction '$n_z$' ($n_z > n_x$, $n_y$).

Referring to FIG. 2B, as light having an incident angle (Θ) with respect to a director of discotic liquid crystal 102 increases, a refractive index for a primary (P) wave decreases in a viewing angle compensating plate ($\Delta n_p/\Delta\Theta < 0$). Here, the refractive index in an X direction '$n_x$' and the refractive index in a Y direction '$n_y$' are substantially identical, each of which is greater than the refractive index in a Z direction '$n_z$' ($n_z < n_x$, $n_y$). In both FIGS. 2A and 2B, "S" represents a secondary wave.

Figure 2C:
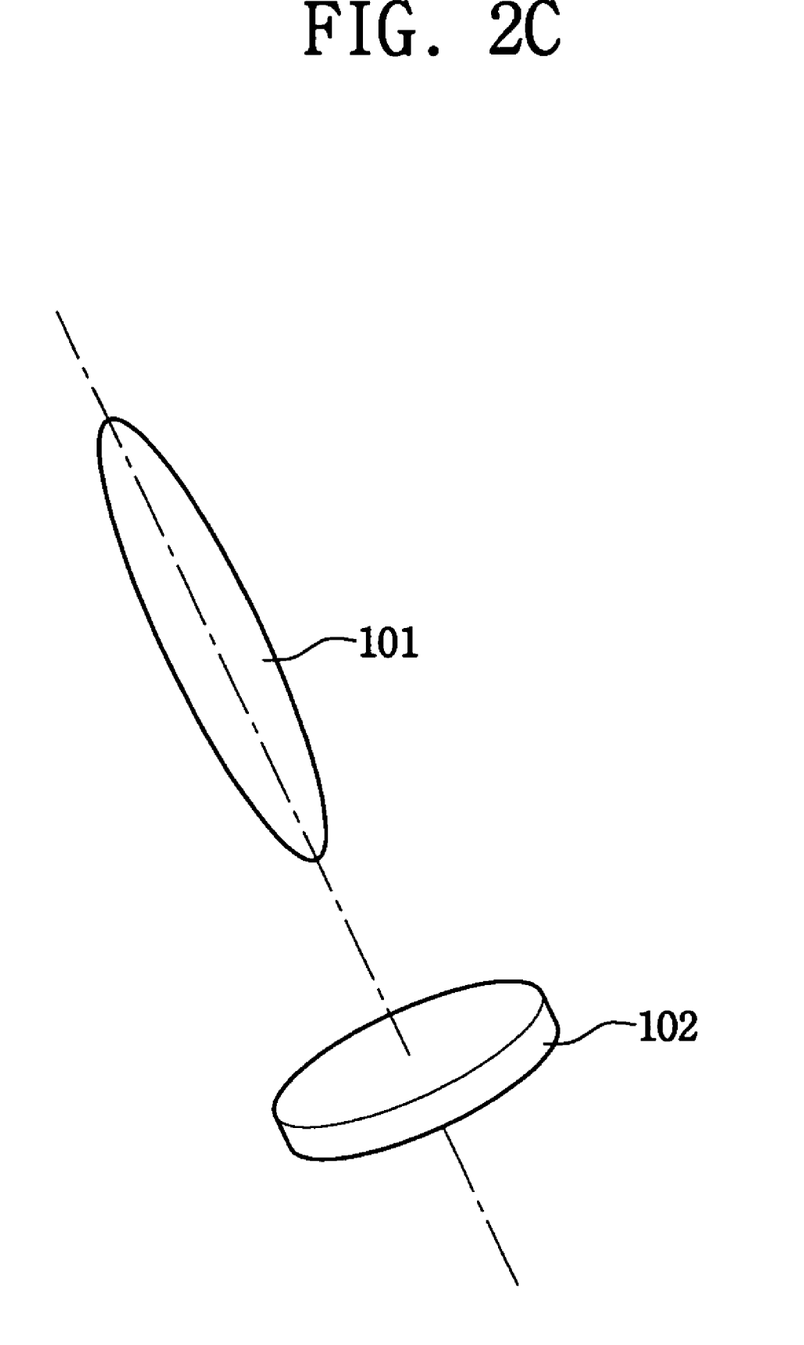
FIG. 2C is a diagram illustrating a process of compensating phase differences between light waves by a combination of the nematic liquid crystal of FIG. 2A and the discotic liquid crystal of FIG. 2B according to an embodiment of the invention.

FIG. 2C is a diagram illustrating a process of compensating phase differences between light waves by a combination of the nematic liquid crystal of FIG. 2A and the discotic liquid crystal of FIG. 2B according to an embodiment of the invention.

Referring to FIG. 2C, when the director of the nematic liquid crystal 101 is parallel with the radial axis of the discotic liquid crystal 102, the phase differences in the direction of light is more or less compensated. This is because the refractive index in the Z direction '$n_z$' has the greatest value in the liquid crystal layer and the smallest value in the compensating plate as shown in FIGS. 2A and 2B.

Figure 3A:
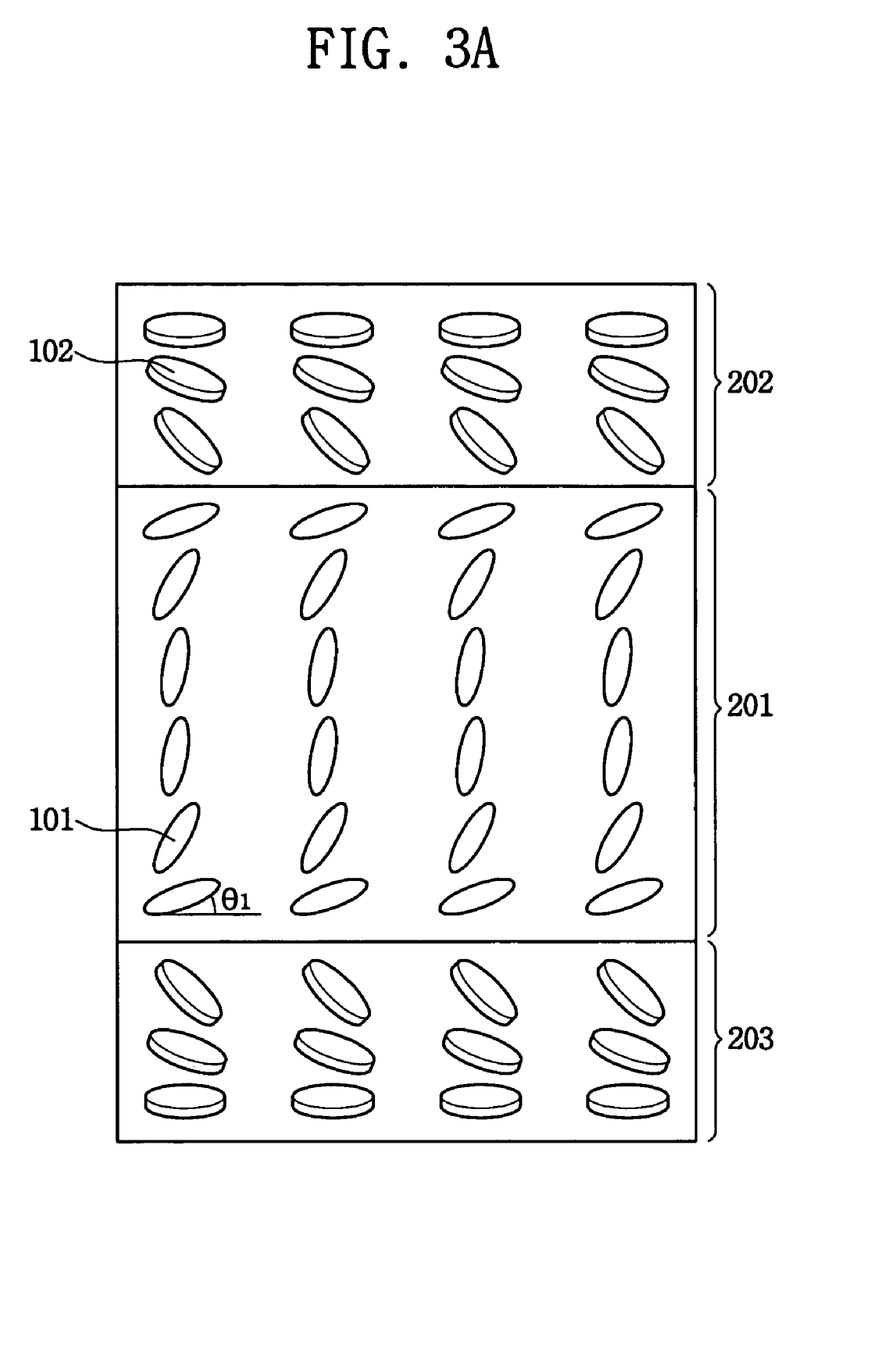
FIG. 3A is a schematic cross-sectional view of viewing angle compensating plates attached to a 90°-twisted nematic liquid crystal layer according to an embodiment of the present invention.

FIG. 3A is a schematic cross-sectional view of viewing angle compensating plates attached to a 90° twisted nematic liquid crystal layer according to an embodiment of the present invention.

Referring to FIG. 3A, a first viewing angle compensating plate 202 is formed on the top of a liquid crystal layer 201 and a second viewing angle compensating plate 203 is formed on the bottom of the liquid crystal layer 201 of a liquid crystal display apparatus. The first and second viewing angle compensating plates 202 and 203 compensate the phase differences between light waves. In FIG. 3A, although only the liquid crystal is displayed, it should be appreciated that in various exemplary embodiments of the invention the viewing angle compensating plates 202 and 203 may each include several films.

Referring to FIG. 3A, nematic liquid crystal molecules 101 are pre-tilted at an angle of $\Theta_1$ near the upper and lower portions of the liquid crystal layer 201. The directions of tilting at both portions are opposite to one another, i.e. the liquid crystal molecules 101 at the top portion are tilted downwards and the liquid crystal molecules 101 at the bottom portion are tilted upwards. In the middle of the liquid crystal layer 201, the nematic liquid crystal molecules 101 are substantially vertically aligned with respect to the viewing angle compensating plate 202.

The nematic liquid crystal molecules 101 in the liquid crystal layer 201 are arranged to minimize Helmholtz free energy. The Helmholtz free energy density of the nematic liquid crystal molecules 101 in the liquid crystal layer 201 is a summation of elastic energy density of the nematic liquid crystal molecules 101 and energy density caused by an electromagnetic field applied to the nematic liquid crystal molecules 101. Elastic energy density is generated when liquid crystal is splayed, twisted or bent. The total elastic energy density plus the electromagnetic field energy density ($\frac{1}{2}(\epsilon_0 E^2 + \mu_0 H^2)$, where $\epsilon_0$ is the electric permittivity, E is the electric field strength, $\mu_0$ is the magnetic permeability, and H is the magnetic field strength) gives the Helmholtz free energy density. In an electrostatic field, a magnetic field can be ignored.

The integration of the Helmholtz free energy density over a space that the total liquid crystal layer occupies gives a Helmholtz free energy. A Euler-Lagrange equation is set using a variation method. The Euler-Lagrange equation gives the conditions under which the Helmholtz free energy has a minimum value.

According to the Euler-Lagrange equation, Helmholtz free energy has a minimum value when the pre-tilt angle of the nematic liquid crystal molecules 101 at the upper and lower portions of the liquid crystal layer 201 are identical, and symmetrically arranged about the central portion of the liquid crystal layer 201.

The value for the pre-tilt angle $\Theta_1$ ($0<\Theta_1<90$) of the nematic liquid crystal molecules 101 arranged near the boundary of the liquid crystal layer 201 and the viewing angle compensating plates 202 and 203 is substituted into the Euler-Lagrange equation. The substitution of the value for $\Theta_1$ into the Euler-Lagrange equation results in an overall arrangement of the nematic liquid crystal molecules 101 in the liquid crystal layer 201 that has the same effect as the arrangement shown in FIG. 2C. That is, the director of discotic liquid crystal molecules 102 in the first and second viewing angle compensating plates 202 and 203 is parallel with the radial axis of nematic liquid crystal molecules 101 in the liquid crystal layer 201, thereby reducing phase differences and improving viewing angle as described with reference to FIG. 2C. It should be appreciated that, although the nematic liquid crystal molecules 101 are not shown as being twisted in FIG. 3A, in practice, the nematic liquid crystal molecules 101 are twisted 90° by a condition at the boundary.

Figure 3B:
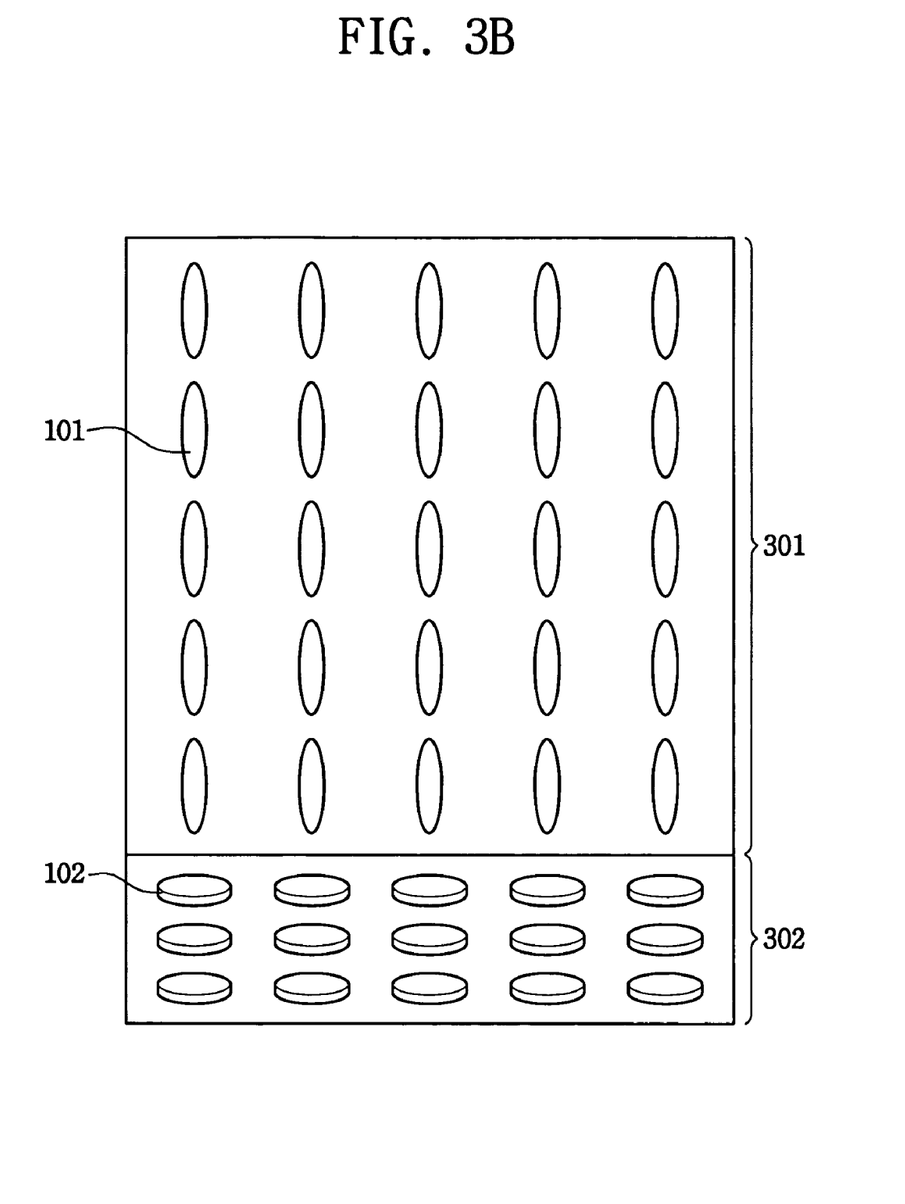
FIG. 3B is a schematic cross-sectional view of a viewing angle compensating plate including discotic liquid crystal attached to a vertical alignment liquid crystal layer according to another embodiment of the present invention.

FIG. 3B is a schematic cross-sectional view of a viewing angle compensating plate including discotic liquid crystal attached to a vertical alignment liquid crystal layer according to another embodiment of the present invention. It should be appreciated that, although only the liquid crystal is shown in FIG. 3B, the viewing angle compensating plate 302 may include several films.

Referring to FIG. 3B, the nematic liquid crystal molecules 101 are vertically aligned in a liquid crystal layer 301 of a vertical alignment mode liquid crystal display apparatus.

As described above, a pre-tilt angle of 90° is substituted into the Euler-Lagrange equation as a boundary condition. Implementing the results of the Euler-Lagrange equation, the nematic liquid crystal molecules 101 are arranged as shown in FIG. 3B. A vertical alignment mode liquid crystal display apparatus including the viewing angle compensating plate 302 has a shorter response time than a 90°-twisted mode liquid crystal display apparatus including the viewing angle compensating plates 202 and 203 shown in FIG. 3A. In addition, the overall structure of a vertical alignment mode liquid crystal display apparatus including the viewing angle compensating plate 302 is simpler because it requires only one viewing angle compensating plate and the discotic liquid crystal molecules 102 have the same alignment. The viewing angle compensating plate 302 can be attached to a color filter substrate or array substrate of a vertical alignment mode liquid crystal display apparatus.

Figure 4:
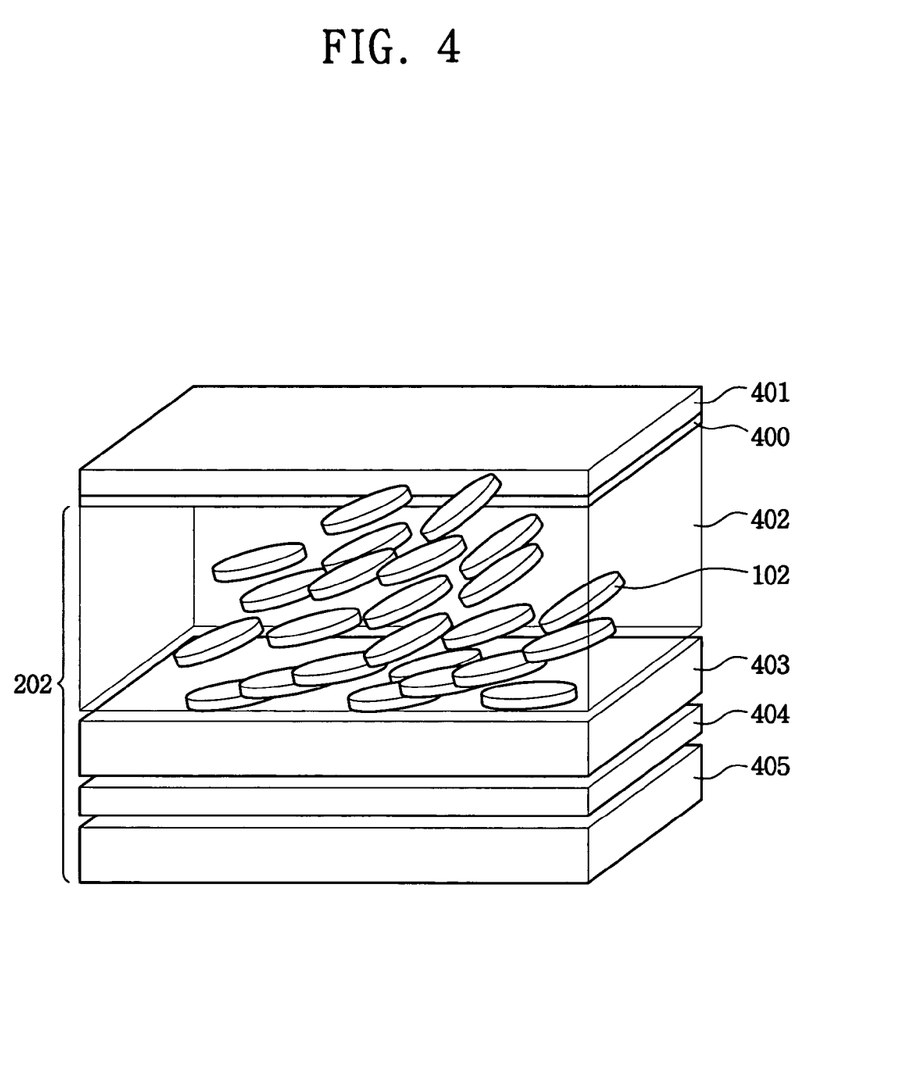
FIG. 4 is a partial sectional perspective view of a viewing angle compensating plate attached to a glass substrate according to an embodiment of the invention.

FIG. 4 is a partial sectional perspective view of a viewing angle compensating plate attached to a glass substrate according to an embodiment of the invention.

In FIG. 4, a viewing angle compensating plate attached to the 90°-twisted nematic liquid crystal layer of FIG. 3A is illustrated. The viewing angle compensating plate that is attached to the liquid crystal layer of the vertical alignment mode liquid crystal display apparatus of FIG. 3B has the same structure as that of the 90°-twisted nematic mode liquid crystal display apparatus except for the direction of the liquid crystal. Therefore, the viewing angle compensating plate that is attached to the liquid crystal layer of the vertical alignment mode liquid crystal display apparatus is not described in further detail.

Referring to FIG. 4, the viewing angle compensating plate 202 includes a first protection film 405, a polarizing film 404, a second protection film 403 and a discotic liquid crystal layer 402 formed over the second protection film 403. The first and second protection films 405 and 403 may include triacetyl cellulose (TAC), and the polarizing film 404 may include polyvinyl alcohol (PVA).

The first protection film 405 and the second protection film 403 adhered to the polarizing film 404 protect and also support the polarizing film 404. Although the viewing angle compensating plate 202 may have only one protection film, both protection films 403 and 405 are preferably included to prevent both sides of the polarizing film 404 from being damaged.

The polarizing film 404 is produced after stretching a film including polyvinyl alcohol in one direction and then adsorbing iodine or diachronic pigment to the polyvinyl alcohol film. The direction of stretching corresponds to the direction of the absorption axis of the polarizer.

The liquid crystal layer 402 is prepared by applying a solvent including discotic liquid crystal molecules 102 to the second protection film 403 and vaporizing the solvent.

The discotic liquid crystal molecules 102 in the discotic liquid crystal layer 402 are tilted by a rubbing process to produce a viewing angle compensating plate 202.

The viewing angle compensating plate 202 is adhered to a glass substrate 410 by an adhesive 400.

It should be appreciated that, although the thickness of the discotic liquid crystal layer 402 is exaggerated for clarity in FIG. 4, the discotic liquid crystal layer 402 is actually thinner than the other films. In a conventional viewing angle compensating plate, the discotic liquid crystal layer has a thickness of about 2 μm to 3 μm, the second protection film has a thickness of about 110 μm, the polarizing film has a thickness of about 25 μm, and the first protection film has a thickness of about 80 μm.

The thickness of the second protection film 403 and the first protection film 405 that protect the polarizing film 404 affects the display quality of the liquid crystal display apparatus. In particular, the thickness difference between the second protection film 403 and the first protection film 405 is a major reason for the mottle shown in FIG. 1. The mechanism by which the thickness of the second protection film 403 and the first protection film 405 causes the mottle will be described in detail below.

Figure 5A:
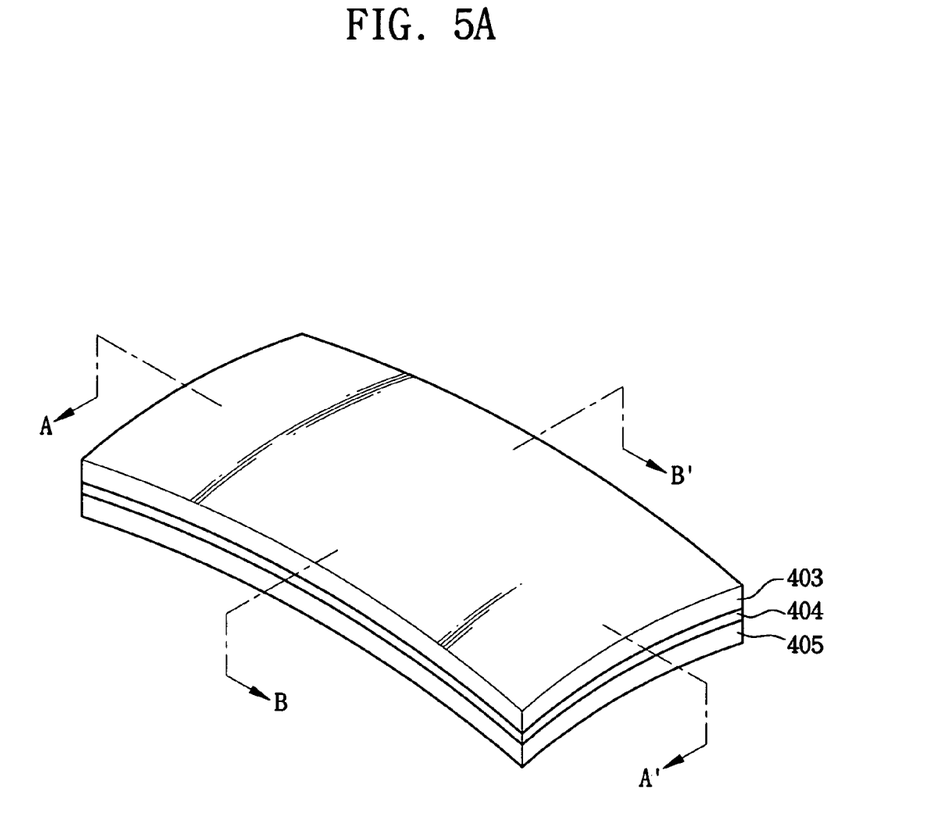
FIG. 5A is a schematic perspective view illustrating bending of a viewing angle compensating plate when a first protection film and a second protection film of the viewing angle compensating plate have different rates of thermal expansion or contraction.
Figure 5B:
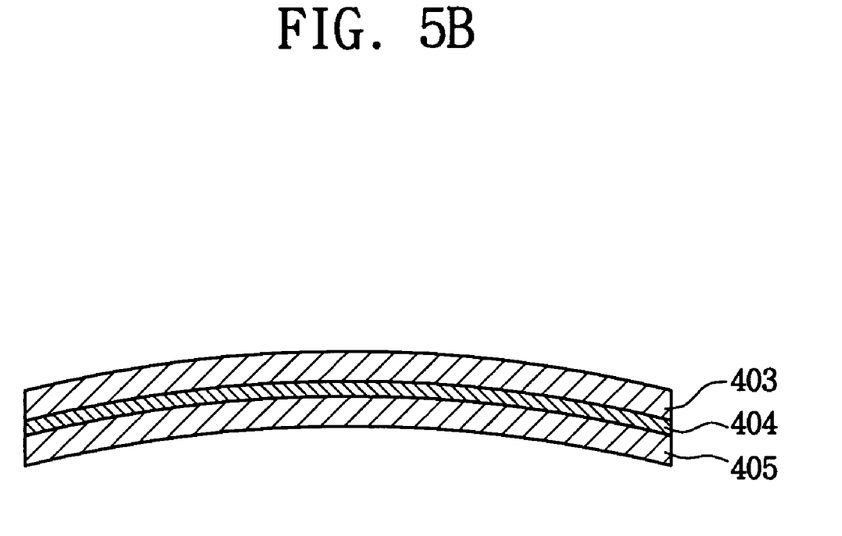
FIG. 5B is a cross-sectional view taken along the line A-A' of FIG. 5A.
Figure 5C:
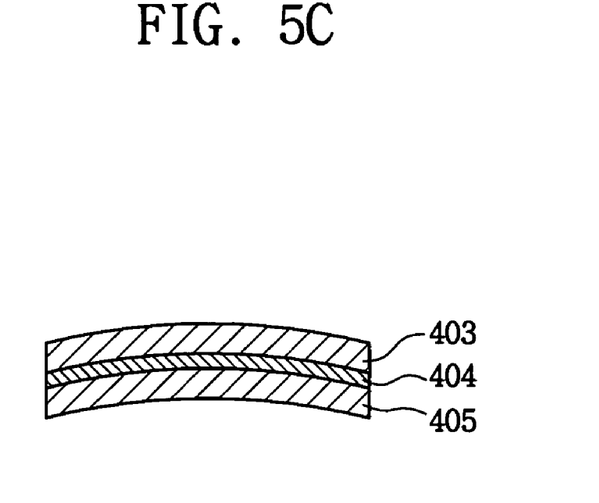
FIG. 5C is a cross-sectional view taken along the line B-B' of FIG. 5A.

FIG. 5A is a schematic perspective view illustrating bending of a viewing angle compensating plate when a first protection film and a second protection film have different rates of thermal expansion or contraction. FIG. 5B is a cross-sectional view taken along the line A-A' of FIG. 5A. FIG. 5C is a cross-sectional view taken along the line B-B' of FIG. 5A.

Generally, a liquid crystal display apparatus includes a liquid crystal display panel and a backlight assembly. The liquid crystal display panel adjusts the alignment of liquid crystal in accordance with an image signal and controls the transmittance of light. The backlight assembly provides light to the liquid crystal display panel. The viewing angle compensating plate in the liquid crystal display panel thermally contracts due to the heat generated in the backlight assembly.

When the first protection film 405 and the second protection film 403 have different rates of thermal expansion or contraction, the viewing angle compensating plate 202 becomes bent as depicted in FIG. 5A.

When the viewing angle compensating plate 202 is bent, the alignment of the discotic liquid crystal molecules 102 formed on the viewing angle compensating plate 202 is changed. When the alignment of the liquid crystal molecules 102 changes, the radial axis of the discotic liquid crystal 102 does not remain parallel with the director of the nematic liquid crystal 101. Thus, the mottle appears as shown in FIG. 1.

Accordingly, it is preferable that the rates of thermal expansion or contraction of the second protection film 403 and the first protection film 405 are substantially identical. In this case, bending of the substrate does not occur and generation of mottle is reduced.

Figure 6:
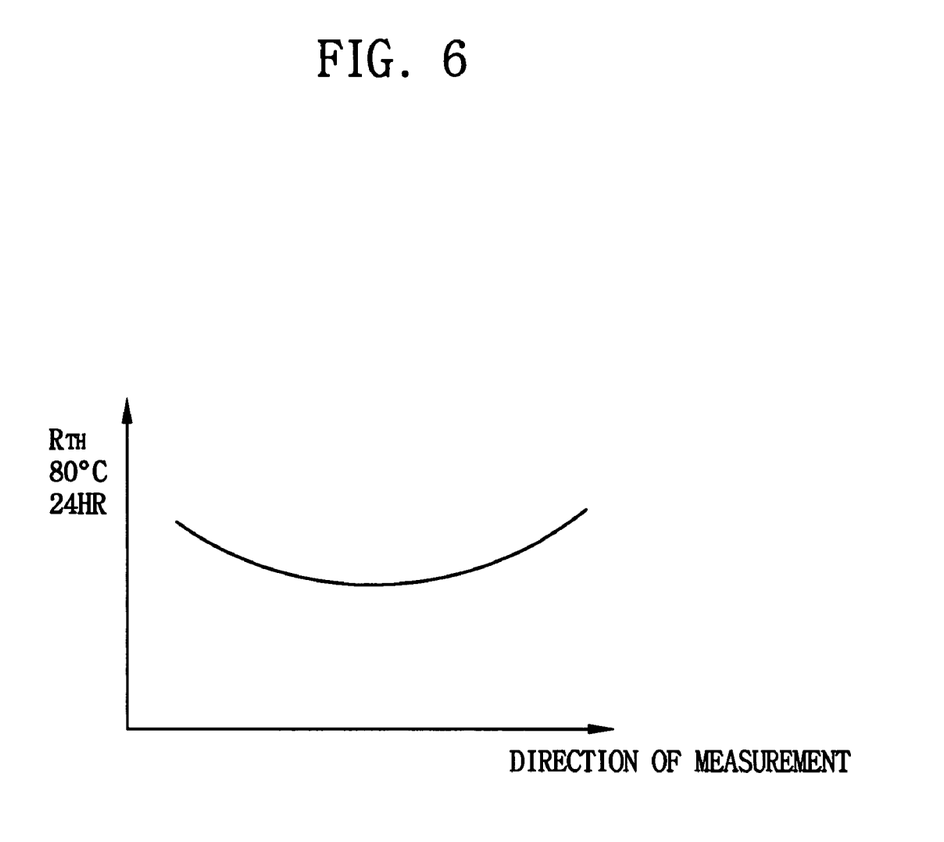
FIG. 6 is a graph illustrating retardation value measured across section A-A' in FIG. 5A.

FIG. 6 is a graph illustrating retardation value measured across section A-A' in FIG. 5A.

Referring to FIG. 6, the retardation value increases at the end portions of the viewing angle compensating plate and decreases at the central portion.

A retardation value indicates an optical path difference of light waves polarized while passing through an optical anisotropic medium. When employing a viewing angle compensating plate, retardation value is reduced by discotic liquid crystal disposed in a direction opposite to that of nematic liquid crystal. As shown in FIG. 6, because maximum deflection occurs at the edge portions of the viewing angle compensating plate 202, the retardation value increases near the edge portions, thus causing the mottle of FIG. 1.

Generation of the mottle according to the thickness of the first and second protection films 405 and 403 in the viewing angle compensating plate 202 is shown in Table 1 below.

TABLE 1

| Layers | Conventional viewing angle compensating plate | sample 1 | sample 2 | sample 3 | sample 4 |
|---|---|---|---|---|---|
| adhesive | | 25 μm | | | |
| Second protection film | 110 μm | 110 μm | 60 μm | 60 μm | 60 μm |
| Polarizing film | | 25 μm | | | |
| First protection film | 80 μm | 40 μm | 40 μm | 60 μm | 80 μm |
| Generation of mottle | X | XX | Δ | ◯ | ◯ |

The viewing angle compensating plate in each of the samples was maintained at 70° C. for 4 hours, 8 hours and 24 hours. The generation of mottle was investigated.

In table 1, 'XX' represents a lot of mottle, 'X' represents some mottle, 'Δ' represents reduction of mottle, and '◯' represents great reduction of mottle. In view of display quality, '◯' represents excellent, 'Δ' represents good, and 'X' represents poor. The thickness of the adhesive and the polarizing film was 25 μm in each of the samples.

In the conventional viewing angle compensating plate, the thickness of the second protection film is about 110 μm, and the thickness of the first protection film is about 80 μm. As shown in Table 1, mottle occurred on the display when the conventional viewing angle compensating plate was used.

In sample 1, the thickness of the second protection film is 110 μm, and the thickness of the first protection film is 40 μm. When the first protection film is made thinner, the rate of heat expansion or contraction increases. Thus, as shown in Table 1, more mottle was generated using the viewing angle compensating plate of sample 1.

In sample 3, the second protection film has a thickness of about 60 μm, and the first protection film has a thickness of about 60 μm. As shown in Table 1, the generation of mottle was greatly reduced and the display quality was excellent. When the first protection film and the second protection film have substantially identical thickness, the degree of expansion or contraction of the first and second protection film is also substantially identical. Hence, bending of the viewing angle compensating plate does not occur, and the arrangement of the liquid crystal is not greatly changed, thereby reducing mottle.

In sample 4, the thickness of the second protection film is about 60 μm, and the thickness of the first protection film is about 80 μm. Although the thickness of the first protection film is different from that of the second protection film as in sample 2, the display quality is still good because of the liquid crystal layer and the adhesive formed on the second protection film.

In sample 2, the thickness of the second protection film is about 60 μm, and the thickness of the first protection film is about 40 μm. Although the first protection film of sample 2 is much thinner than that of the first protection film of the conventional viewing angle compensating plate as in sample 1, the display quality of the liquid crystal display apparatus of sample 2 is improved compared to the conventional viewing angle compensating plate due to the presence of the adhesive.

In particular, as shown in FIG. 4, the viewing angle compensating plate is adhered to the glass substrate by the adhesive. The viewing angle compensating plate has a grater rate of thermal expansion or contraction than the glass substrate. Hence, the viewing angle compensating plate expands or contracts much more than the glass substrate. The viewing angle compensating plate adhered to the glass substrate expands or contracts less than a viewing angle compensating plate that is not adhered to a glass substrate.

The force required for the viewing angle compensating plate to expand or contract is proportional to the thickness of the viewing angle compensating plate. A required force of expansion or contraction is a summation of the forces required for all the molecules to expand or contract, and a number of molecules is proportional to a cross section in the direction of expansion or contraction. This concept also explains the phenomenon that a thick spring has a tensile force greater than that of a thin spring.

When the thickness of the viewing angle compensating plate is reduced, the force of expansion or contraction is relatively weakened. Thus, the thinner the viewing angle compensating plate, the greater the adhesive can reduce the force of expansion or contraction of the viewing angle compensating plate. As a result, bending caused by thermal contraction is also greatly reduced.

In summary, when occurrence of bending of the viewing angle compensating plate is reduced, generation of mottle is lowered.

Figure 7:
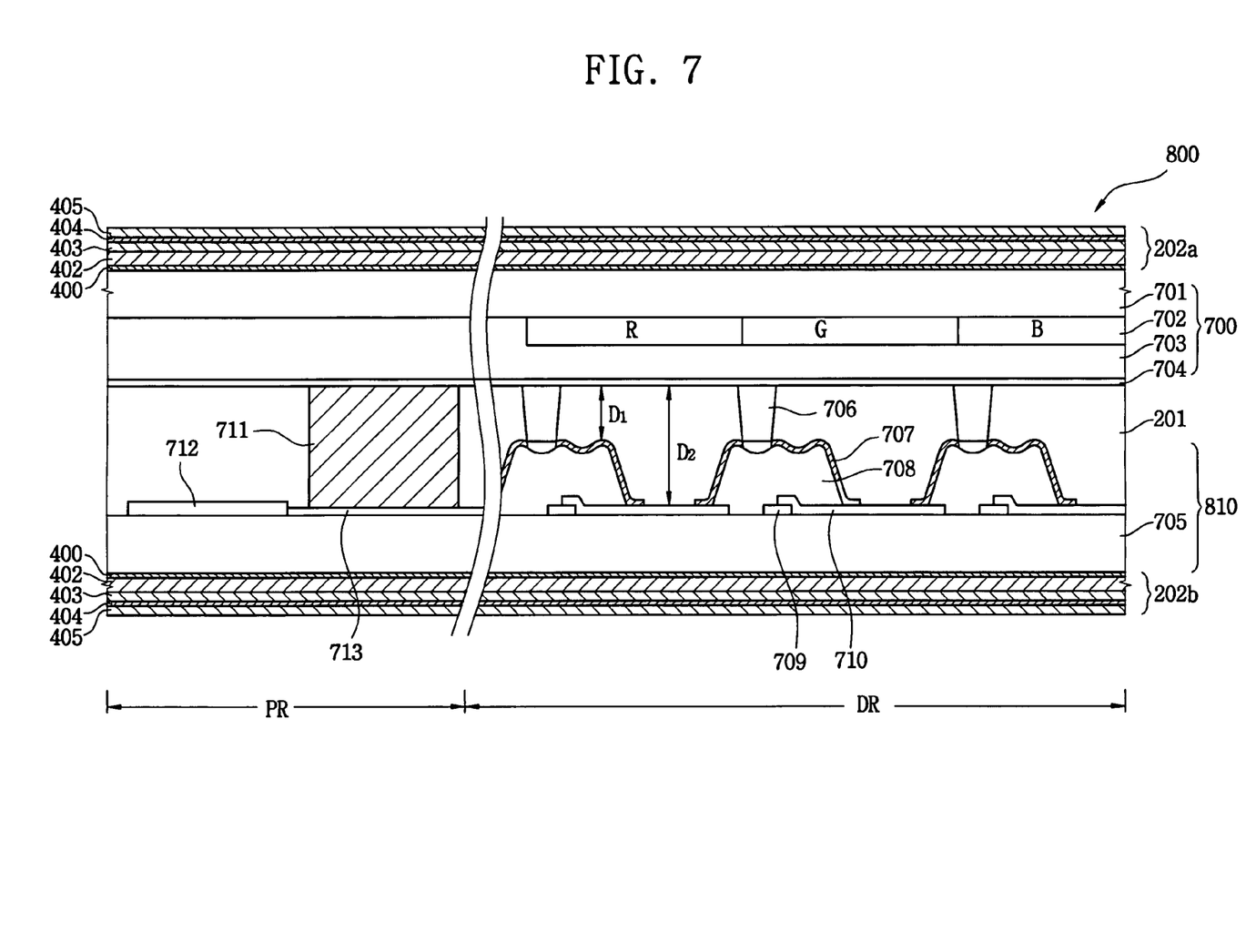
FIG. 7 is a schematic cross-sectional view of a liquid crystal display apparatus including a viewing angle compensating plate according to an embodiment of the present invention.

FIG. 7 is a schematic cross-sectional view of a liquid crystal display apparatus including a viewing angle compensating plate according to an embodiment of the present invention.

Referring to FIG. 7, the liquid crystal display apparatus includes a liquid crystal display panel 800 and a backlight assembly (not shown). The backlight assembly provides light to the liquid crystal display panel 800.

The liquid crystal display panel 800 has a color filter substrate 700, an array substrate 810 and a liquid crystal layer 201 interposed between the color filter substrate 700 and the array substrate 810.

The backlight assembly is disposed under the liquid crystal display panel 800. The backlight assembly provides light to the liquid crystal display panel 800.

The backlight assembly has a light guiding plate, a lamp and a light diffusion sheet. The lamp provides light to the light guiding plate from a side portion or a lower portion of the light guiding plate. The light diffusion sheet controls the brightness of light exiting to the light guiding plate.

The color filter substrate 700 includes a first glass substrate 701, color filters 702, a planarizing film 703 and a common electrode 704.

The color filters 702 include a red color filter R, a green color filter G and a blue color filter B. The color filters 702 are formed on the first glass substrate 701. The planarizing film 703 is formed on the color filters 702.

A first viewing angle compensating plate 202a is adhered to the color filter substrate 700 by an adhesive layer 400.

The viewing angle compensating plate 202a includes a first protection film 405, a polarizing film 404, a second protection film 403 and a liquid crystal layer 402 including discotic liquid crystal. The rates of thermal expansion or contraction of the first protection film 405 and the second protection film 403 are substantially identical. The first protection film 405 and the second protection film 403 expand or contract by the same rates. Thus, heat converted from light generated from the backlight assembly does not cause bending of the viewing angle compensating plate 202a. Accordingly, the edge portion of the viewing angle compensating plate 202a does not detach from the color filter substrate 700, and the molecular arrangement of the discotic liquid crystal in the liquid crystal layer 402 does not change.

The array substrate 810 includes a second glass substrate 705, a thin film transistor (TFT) 709, a transparent electrode 710, a gate operating circuit 712, a data operating circuit (not shown), a reflective electrode 707 and a connecting wiring 713.

The array substrate 810 is divided into a display region (DR) and a peripheral region (PR). The thin film transistor 709, the transparent electrode 710 and the reflective electrode 707 are disposed in the display region. The operating circuit 408 and the data operating circuit (not shown) are disposed in the peripheral region.

A plurality of thin film transistors 709 is formed on the second glass substrate 705. The thin film transistors 709 are arranged in a matrix form on the second glass substrate 705. The transparent electrode 710 is a pixel electrode and is formed on a portion of the thin film transistor 709 and the second glass substrate 705. Thus, the thin film transistor 709 is electrically connected to the second glass substrate 705.

An organic insulation layer 708 is formed on a portion of the second glass substrate 705 where the thin film transistor 709 and the transparent electrode 710 contact one another. The organic insulation layer 708 is applied on the entire substrate and then etched to expose a portion of the transparent electrode 710.

The organic insulation layer 708 has a plurality of grooves on the surface thereof. The reflective electrode 707 covers the organic insulation layer 708 and has a uniform thickness. Thus, the reflective electrode 707 also has grooves on the surface thereof.

The grooves enhance the reflectance of the reflective electrode 707. The reflective electrode 707 includes a high reflective material such as aluminum (Al), silver (Ag) or chromium (Cr). The reflective electrode 707 reflects light irradiated from the liquid crystal display panel 800, even when the backlight assembly does not provide light to the liquid crystal display panel 800.

The gate operating circuit 712 and the connecting wiring 713 are formed in the peripheral region of the array substrate 810. The gate operating circuit 712 is electrically connected to the gate electrode of the thin film transistor 709 through the connecting wiring 713.

The thin film transistor 709 includes a gate electrode, a drain electrode and a source electrode. As described above, the gate electrode is electrically connected to the connecting wiring 713. The drain electrode is electrically connected to the transparent electrode 710, and the source electrode is electrically connected to the data operating circuit (not shown).

A second viewing angle compensating plate 202b is adhered to the lower portion of the array substrate 810 by an adhesive layer 400. As described above, the viewing angle compensating plate 202b also includes a first protection film 405, a polarizing film 404, a second protection film 403 and a liquid crystal layer 402 including discotic liquid crystal.

The rates of thermal expansion or contraction of the first protection film 405 and the second protection film 403 are substantially identical. The first protection film 405 and the second protection film 403 expand or contract by the same rates. Thus, heat converted from light generated from the backlight assembly does not cause bending of the first protection film 405 and the second protection film 403. Accordingly, the edge portion of the viewing angle compensating plate 202b does not detach from the color filter substrate 700 and the molecular arrangement of the discotic liquid crystal in the liquid crystal layer 402 does not change.

The color filter substrate 700 is combined with the array substrate 810 by a sealant 711. The sealant 711 is positioned in the peripheral regions (PR) of the color filter substrate 700 and the array substrate 810.

A spacer 706 is formed on the common electrode 704 to maintain a space between the color filter substrate 700 and the array substrate 810.

The liquid crystal layer 201 includes nematic liquid crystal. The first liquid crystal layer 201 corresponds to the liquid crystal layer 201 of FIG. 3A.

An electric field applied to the liquid crystal between the common electrode 704 and the reflective electrode 707 or the transparent electrode 710 changes the molecular arrangement of the liquid crystal. Accordingly, the amount of light exiting to the liquid crystal display panel 800 is changed.

Common voltage (ground voltage) is applied to the common electrode 704. When the gate operating voltage is applied to one of the thin film transistors 709 arranged in a matrix form in the gate operating circuit 712, the thin film transistor 709 is turned on. When the image signal voltage is applied to the source electrode of the thin film transistor 709 in the data operating circuit (not shown), the voltage is then applied to the transparent electrode 710 and the reflective electrode 707 through the drain electrode. Thus, the arrangement of the nematic liquid crystal between the first transparent electrode 704 and the reflective electrode 707 or transparent electrode 710 is changed.

The light generated from the backlight assembly is polarized while passing through the second viewing angle compensating plate 202b on the array substrate 810. The transmittance of light is changed as the light passes through the nematic liquid crystal of the liquid crystal layer 201 between the array substrate 810 and the color filter substrate 700. Light having a certain wavelength is transmitted through the color filter 702 of the color filter substrate 700 so as to exhibit color. Light is polarized while passing through the first viewing angle compensating plate 202a on the color filter substrate 700 and then displays an image. The phase difference caused by the nematic liquid crystal in the liquid crystal layer 202a is reduced by the discotic liquid crystal in the first viewing angle compensating plate 202a and the second viewing angle compensating plate 202b. Accordingly, the liquid crystal display apparatus has an improved viewing angle.

A viewing angle compensating plate according to various exemplary embodiments of the present invention does not bend due to heat generated from a liquid crystal display apparatus, and thus mottle is reduced.

A transflective liquid crystal display apparatus employing 90°-twisted nematic liquid crystal has been described as an example. As will be understood by those skilled in the art, the viewing angle compensating plate 202 may also be used in a vertical alignment mode liquid crystal display apparatus as well as a transmitting liquid crystal display apparatus. In the vertical alignment mode LCD, as described above, only one viewing angle compensating plate is employed.

When a viewing angle compensating plate according to various exemplary embodiments of the present invention expands or contracts due to heat generated from a backlight assembly of a liquid crystal display apparatus, the rates of thermal expansion or contraction of a first protection film and a second protection film of the viewing angle compensating plate are substantially identical. Thus, the viewing angle compensating plate is not bent and generation of mottle is reduced. As a result, display quality of a liquid crystal display apparatus including the viewing angle compensating plate is improved.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A method of forming a viewing angle compensating plate, comprising:

forming a first protection film comprising triacetyl cellulose over one side of a polarizing film;

forming a second protection film comprising triacetyl cellulose over another side of a polarizing film, the second protection film having a linear thermal expansion coefficient that is substantially identical to that of the first protection film and a thickness difference between the thickness of the first protection film and the second protection film is under 20% of an average of the thickness of the first protection film and the second protection film; and forming a discotic liquid crystal layer over the second protection film, wherein forming the discotic liquid crystal layer comprises applying a solvent comprising discotic liquid crystal molecules to the second protection film, wherein the solvent comprising the discotic liquid crystal molecules is directly in contact with the second protection film.

2. The method of claim 1, wherein the step of forming a polarizing film comprises:

stretching a polyvinyl alcohol film in one direction, wherein the one direction of stretching corresponds to a direction of an absorption axis of the polarizing film; and adsorbing at least one of iodine and diachronic pigment to the polyvinyl alcohol film.

3. The method of claim 1, wherein the step of forming the discotic liquid crystal layer further comprises: vaporizing the solvent.

4. The method of claim 1, wherein the first and second protection films are made of the same material.

5. The method of claim 1, wherein the first protection film and the second protection film have a substantially same thickness.

6. The method of claim 1, wherein the slope of the axis of the liquid crystal molecules becomes larger according to the direction perpendicular to the second protection film.

* * * * *